United States Patent
Andersen

[11] Patent Number: 6,035,495
[45] Date of Patent: Mar. 14, 2000

[54] HOSE CLAMP

[75] Inventor: John L. Andersen, Jacksonville, Tex.

[73] Assignee: Builder's Best, Inc., Jacksonville, Tex.

[21] Appl. No.: 09/327,729

[22] Filed: Jun. 8, 1999

Related U.S. Application Data

[63] Continuation-in-part of application No. 09/131,990, Aug. 11, 1998, Pat. No. 5,943,743.

[51] Int. Cl.[7] .................................................. B65D 63/02
[52] U.S. Cl. ........................... 24/279; 285/252; 285/253; 24/20 LS
[58] Field of Search ................................ 24/279, 20 CW, 24/20 EE, 23 W, 23 R, 20 R, 274 R, 274 P, 20 LS; 285/252, 253

[56] References Cited

U.S. PATENT DOCUMENTS

| | | | |
|---|---|---|---|
| 1,205,926 | 11/1916 | Palmer et al. | |
| 1,479,317 | 1/1924 | Peirce | |
| 1,830,558 | 11/1931 | Olson | |
| 2,335,464 | 11/1943 | Tinnerman | 24/19 |
| 2,423,627 | 7/1947 | Tinnerman | 173/273 |
| 3,648,335 | 3/1972 | Henning | 24/279 |
| 3,708,834 | 1/1973 | Anderson et al. | 24/279 |
| 4,078,281 | 3/1978 | Pease et al. | 24/279 |
| 4,246,690 | 1/1981 | Meckstroth et al. | 29/526 |
| 4,310,956 | 1/1982 | Meckstroth et al. | 24/279 |
| 4,464,814 | 8/1984 | Senatro | 24/279 |
| 5,131,698 | 7/1992 | Calmettes et al. | 24/20 LS |

*Primary Examiner*—James R. Brittain
*Assistant Examiner*—Robert J. Sandy
*Attorney, Agent, or Firm*—Price, Heneveld, Cooper, DeWitt and Litton

[57] ABSTRACT

A hose clamp having a self-threading hardened screw extending through outwardly extending tabs on the generally circular clamp, the head end of the screw fitting through a clearance opening in the first tab, and the screw threadably engaged with the second tab, the first tab being reinforced against bending by a deformation dimple at the juncture to the circular band, and the second tab being bendable upon screw tightening to cause the screw angle to change sufficiently for the screw threads to cut slots in the band, forming a worm-type drive engagement.

11 Claims, 1 Drawing Sheet

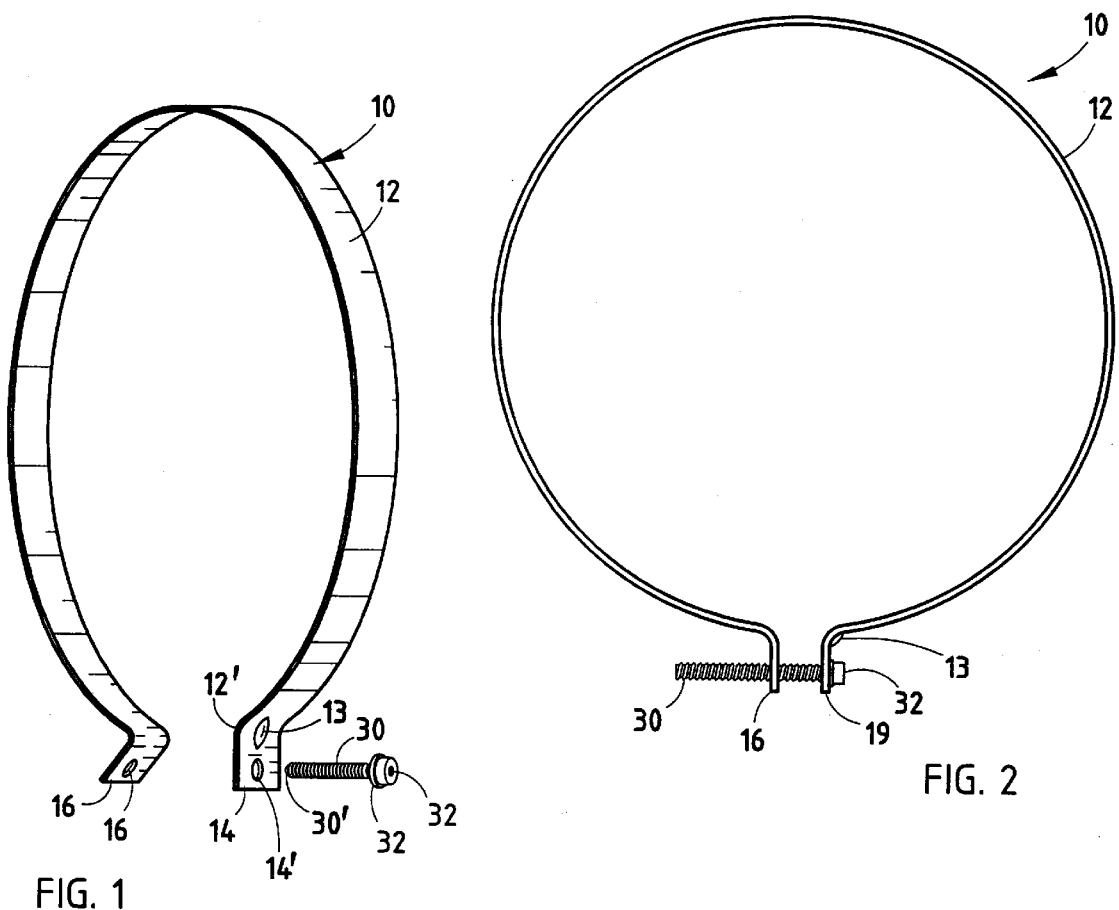
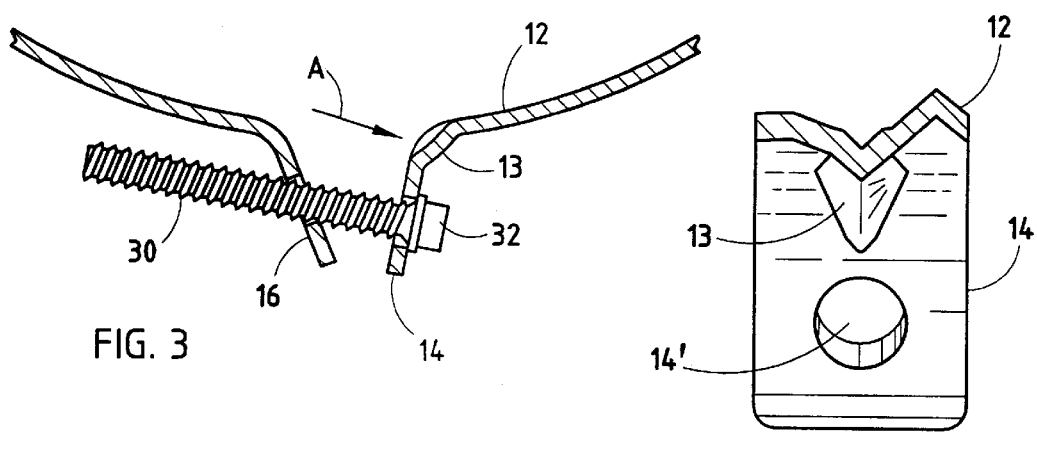

HOSE CLAMP

RELATED APPLICATION

This application is a continuation-in-part application of Ser. No. 09/131,990 filed Aug. 11, 1998, now U.S. Pat. No. 5,943,743, and entitled HOSE CLAMP.

BACKGROUND OF THE INVETION

This invention relates to a hose clamp capable of tightening without stripping, yet having a low cost of manufacture.

Hose clamps of a variety of types have been devised previously. One difficulty with known hose clamps is that of stripping if slightly excessive tightening force is applied. It is important to fully tighten the clamp to prevent leakage, but a slight overtightening can result in clamp failure. To counteract this, some hose clamps have been formed with a nut secured adjacent one of the clamp ears for engagement with a plurality of threads on the tightening screw. Unfortunately, making and mounting a nut on the clamp is costly. Efforts to eliminate the nut have led to special folded tabs as, for example, in U.S. Pat. Nos. 4,246,690; 4,078,281; and 4,310,956. One proposal shown in FIG. 7 of U.S. Pat. No. 4,246,690 and its related patents noted above has a simple extension of the strip protruding tangentially from the remainder of the strip for engagement of a couple turns of the screw threads. Other variations are set forth in U.S. Pat. Nos. 2,423,627 and 1,479,317. Providing the multiple folded structure adds cost to the product and too often does not eliminate the stripping problem. A third type of clamp uses a worm drive action of the screw threads with a plurality of transverse slots specially formed in the band. The band is made of hard, high quality steel to withstand the force of the worm drive. These features add considerable production cost.

SUMMARY OF THE INVENTION

The novel clamp is relatively inexpensively manufactured from a simple band of material to achieve excellent resistance against stripping when tightened. The band is generally circular with a pair of tabs protruding outwardly from the two opposite ends. A self-threading screw of greater hardness than that of the band extends through both tabs, the screw head abutting one of the tabs and the screw threads engaging the other tab which is bendable during tightening of the screw to first provide greater bite between the screw and the tab, and then cause a plurality of the screw threads to cut a threading relationship with the band periphery for providing a worm-type drive to prevent stripping from excess tightening. The tab abutted by the screw head has a reinforcing rib element at its juncture with the generally circular band.

These and other features, advantages and objects of the present invention will be further understood and appreciated by those skilled in the art by reference to the following specification, claims and appended drawings.

BRIEF DESCRIPTION OF THE DRAWINGS

FIG. 1 is a perspective exploded view of the clamp mechanism;

FIG. 2 is an elevational view of the clamp being tightened;

FIG. 3 is a fragmentary, enlarged, elevational view of the clamp with the screw having formed a worm drive relationship with the clamp band; and FIG. 4 is an elevational view taken from the direction of the arrow A in FIG. 3.

DETAILED DESCRIPION OF THE PREFERRED EMBODIMENT

Referring now specifically to the drawings, the novel clamp 10 is formed of a generally circular band 12 and a screw 30. Band 12 has a first ear or tab 14 and a second ear or tab 16, projecting generally radially outwardly at the two opposite end portions of the band. These are formed integral with the band and have openings therethrough. Across the juncture 12' of tab 14 with band 12 is an outwardly protruding, offset reinforcing rib 13. This rib can be formed as by stamping, leaving a dimple on the inner side of the junction. Clearance opening 14' through tab 14 is larger in diameter than opening 16' through tab 16. Cooperative with this band is the elongated screw 30 which has a head 32 on one end, preferably hexagonal in configuration, with an integral annular washer surface 32', and also a screwdriver recess. The opposite end of the screw has a nose 30' slightly smaller in diameter than the screw minor diameter. The preferred screw is a self-threading sheet metal screw. A sheet metal screw has threads which are deeper than a machine screw. It has a hardness greater than that of the band 12. Preferably the screw is hardened steel while the band is of carbon steel or some other material of less hardness than screw 30. The hardness of the steel screw surface is at least about HRC (Rockwell C) 45 minimum and preferably in the range of 55–65 Rockwell C. The core of the screw may be of less hardness. In contrast, the hardness of the band is significantly less, and preferably is in the general range of about HRB (Rockwell B) 60±5. The major thread diameter of the screw is smaller than the diameter of orifice 14' but larger than the diameter of orifice 16'. The nose of the screw is slightly smaller than the diameter of orifice 16', as is the minor thread diameter of the screw. For example, a screw major diameter of about 0.182–0.189 inch, a minor diameter of about 0.135–0.141 inch and a tip diameter of about 0.123–0.130 inch works well with a strap or band small orifice of about 0.146 inch diameter and a large orifice of about 0.209 inch. These are examples to illustrate the invention.

A typical difficulty encountered with hose clamps is experienced when the clamp is tightened securely to assure absence of leakage. Slight overtightening can cause stripping of the threads on the screw, or more likely stripping by the screw threads of the band orifice, causing the clamp to fail. Clamps without a nut are particularly susceptible to such failure. Achieving the exact amount of effective tightness is therefore difficult to accomplish since there is always the danger with slightly too much tightening that the clamp will fail due to thread stripping, or with not enough tightening leakage can occur. Thus, prior efforts have been toward strengthening the area at the second tab of the clamp as by attachment of a separately machined nut, multiple layers of material, or the like, as shown in the prior art.

The function of the present novel clamp is to enable the clamp to be readily manufactured without special costly steps, without an added nut, and without multiple tab layers, but assure against stripping of threads by overtightening. A special relationship is provided between the hardened screw and the softer band to effect a worm-type drive when the clamp is reaching maximum tightening. Also, the tab 14 against which screw head 32 abuts has reinforcing rib 13 across the juncture 12' of tab 14 to band 12 to restrain tab 14 against bending when the clamp is tightened.

To attach the novel hose clamp, the generally circular band 12 is placed around the hose and object to be secured, screw 30 is inserted through orifice 14' of ear 14, and screw nose 30' is inserted into orifice 16' of tab 16. Then a screwdriver or wrench is used to rotate head 32 to begin the tightening process. The self-threading screw threads into and through orifice 16' during tightening. As the screw is tightened, the tabs will deflect. Specifically, the initial band angle is manufactured into the tabs, preferably about 100°, although a spring back of about 3° typically occurs. During tightening, the angle expands on the head side tab 14 by up to 10–20° or so, and on the threaded side tab by 3–8°. The head side tab is restrained from excessive bending by reinforcing rib 13 across junction 12'. The reason for the smaller deflection on the threaded side tab is that there is minimum clearance in the threaded tab between the screw and the orifice. The threaded tab therefore cannot deform as much as the head tab due to the tight clearance between the threaded tab orifice and the screw minor diameter, while there is considerable clearance between the screw and opening 14'. The greater thread engagement on the bent tab 16 adds grip in the contact area between the screw and threaded tab 16. The increased grip between threaded tab 16 and the screw adds securement as threaded tab 16 is deflected more and more angularly. The threaded tab thus straightens in the bend at the integral juncture of the tab to the rest of the band, and deflects angularly in the short portion between the bend and the orifice. This is caused by tension in the band due to tightening of the screw. As the screw is tightened still further, the angle of the screw changes and its threads which protrude past, i.e., beyond, tab 16 engage the band material periphery as depicted in FIG. 3. The greater hardness of the screw relative to the band causes the self-threaded screw to begin to cut or form a plurality of parallel, transverse, worm-like thread-engagement slots into the periphery of the band, resulting in the assembly also taking on the characteristics of a worm drive to provide extra strength when it is most needed. This has been found to significantly increase the strength of the clamp assembly to prevent stripping and failure of the clamp when forcefully tightened.

The above description is considered that of the preferred embodiment only. Modifications of the invention will occur to those skilled in the art and to those who make or use the invention. Therefore, it is understood that the embodiment shown in the drawings and described above is/are merely for illustrative purposes and not intended to limit the scope of the invention, which is defined by the following claims as interpreted according to the principles of patent law, including the doctrine of equivalents.

What is claimed is:

1. A hose clamp comprising:

a generally circular band having a pair of end portions, and a generally radially outwardly extending tab at each of said end portions;

each of said tabs having a screw receiving orifice;

a screw having threads and extending through said orifices, having a head engaging one of said tabs, and being in threaded engagement with the other of said tabs;

said one tab having a juncture with said band, and a reinforcing element across said juncture;

said screw having a hardness greater than that of said band;

said other tab being bendable toward said one tab in response to a screw tightening force sufficient to cause the angle of said screw to move toward said band and said screw threads to cut into the periphery of said band to form a type of worm drive engagement into the periphery of said band.

2. The hose clamp in claim 1 wherein said worm drive engagement is at said screw threads which protrude beyond said other tab.

3. The hose clamp in claim 1 wherein said reinforcing element is a rib.

4. The hose clamp in claim 3 wherein said rib is an outward offset in said one tab and said band.

5. The hose clamp in claim 1 wherein said reinforcing element is a stamped rib protruding outwardly of said band and leaving a dimple inwardly of said band.

6. The hose clamp in claim 1 wherein said screw threads are self-threading threads.

7. The hose clamp in claim 1 wherein said screw has a minor diameter, and said orifice in said other tab is sufficiently larger than said minor diameter that when said other tab bends toward said one tab, said screw threads cut new thread engagement within said other tab orifice.

8. The hose clamp in claim 1 wherein said screw is a sheet metal screw.

9. The hose clalmp in claim 1 wherein said band is of carbon steel and said screw is hardened.

10. The hose clamp in claim 1 wherein said screw has a surface hardness of at least about HRC 45.

11. The hose clamp in claim 10 wherein said band has a hardness of about HRB 55–65.

* * * * *